(12) United States Patent
Iwasaki et al.

(10) Patent No.: US 9,172,247 B2
(45) Date of Patent: Oct. 27, 2015

(54) POWER SUPPLY SYSTEM WITH CONTROLLED POWER STORAGE

(75) Inventors: Toshiya Iwasaki, Moriguchi (JP); Atsushi Suyama, Moriguchi (JP); Atsushi Shimizu, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 407 days.

(21) Appl. No.: 13/635,553

(22) PCT Filed: Mar. 23, 2011

(86) PCT No.: PCT/JP2011/056974
§ 371 (c)(1),
(2), (4) Date: Sep. 17, 2012

(87) PCT Pub. No.: WO2011/118627
PCT Pub. Date: Sep. 29, 2011

(65) Prior Publication Data
US 2013/0009463 A1    Jan. 10, 2013

(30) Foreign Application Priority Data

Mar. 24, 2010  (JP) ................................. 2010-067473

(51) Int. Cl.
*H02J 3/32*  (2006.01)
*H02J 7/34*  (2006.01)
*H02J 7/35*  (2006.01)

(52) U.S. Cl.
CPC . *H02J 3/32* (2013.01); *H02J 7/345* (2013.01); *H02J 7/35* (2013.01); *Y02E 60/721* (2013.01); *Y04S 10/126* (2013.01); *Y10T 307/305* (2015.04)

(58) Field of Classification Search
None
See application file for complete search history.

(56) References Cited

U.S. PATENT DOCUMENTS

| | | | |
|---|---|---|---|
| 6,380,715 B1 * | 4/2002 | Kubo | 320/128 |
| 7,199,552 B2 * | 4/2007 | Kobayashi | 320/106 |
| 7,309,966 B2 | 12/2007 | Wobben | |
| 8,350,521 B2 * | 1/2013 | Reineccius | 320/101 |
| 8,552,588 B2 * | 10/2013 | Yang | 307/54 |
| 2003/0047209 A1 | 3/2003 | Yanai et al. | |

(Continued)

FOREIGN PATENT DOCUMENTS

| | | |
|---|---|---|
| JP | 05-284669 | 10/1993 |
| JP | 2003-079054 A | 3/2003 |

(Continued)

OTHER PUBLICATIONS

International Search Report mailed Jun. 7, 2011 issued in corresponding International Application No. PCT/JP2011/056974.

*Primary Examiner* — Rexford Barnie
*Assistant Examiner* — David Shiao
(74) *Attorney, Agent, or Firm* — McDermott Will & Emery LLP

(57) ABSTRACT

A power supply system is provided that can reduce the maximum value of the amount of power per unit time supplied to a load and a power storage portion and that can increase the amount of power stored in the power storage portion. The power supply system (1) includes the power storage portion (11) and a charge-discharge control portion (51) that controls the charge and discharge of the power storage portion (11). The power supply system (1) supplies power to an EV charge portion (311) that is one of power storage portions (31). The charge-discharge control portion (51) charges the power storage portion (11) when a power or a current consumed by the EV charge portion (311) is equal to or less than a predetermined magnitude.

16 Claims, 5 Drawing Sheets

(56) References Cited

U.S. PATENT DOCUMENTS

| | | |
|---|---|---|
| 2006/0240291 A1 | 10/2006 | Kim et al. |
| 2010/0188054 A1* | 7/2010 | Asakura et al. ............... 320/161 |
| 2011/0121779 A1* | 5/2011 | Ichikawa et al. ............. 320/109 |
| 2011/0204720 A1* | 8/2011 | Ruiz et al. ....................... 307/66 |

FOREIGN PATENT DOCUMENTS

| | | |
|---|---|---|
| JP | 2006-302886 A | 11/2006 |
| JP | 2007-534281 A | 11/2007 |
| WO | WO 2009013898 A1 * | 1/2009 |
| WO | WO 2010/010754 A1 | 1/2010 |

* cited by examiner

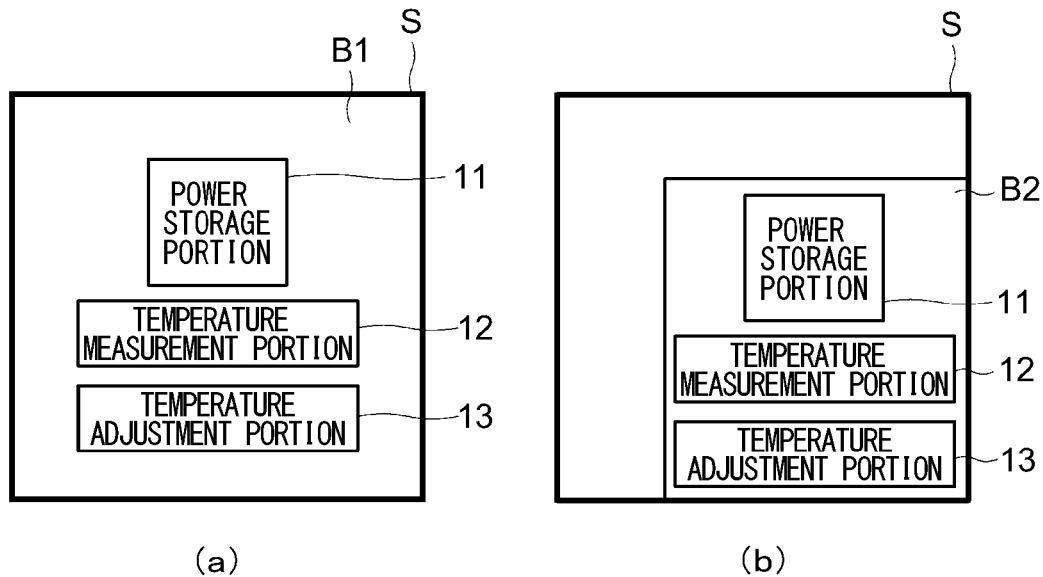
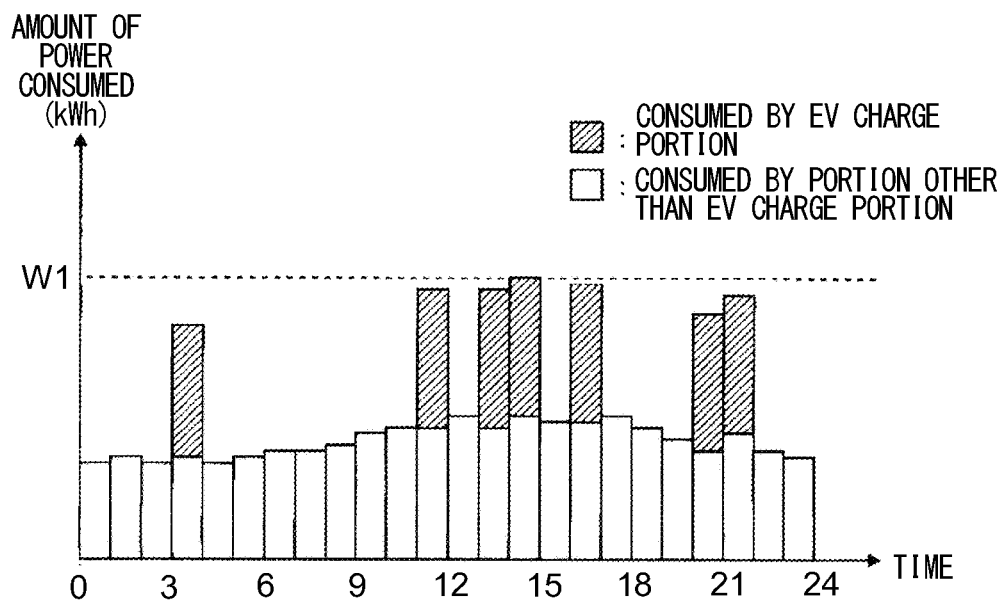

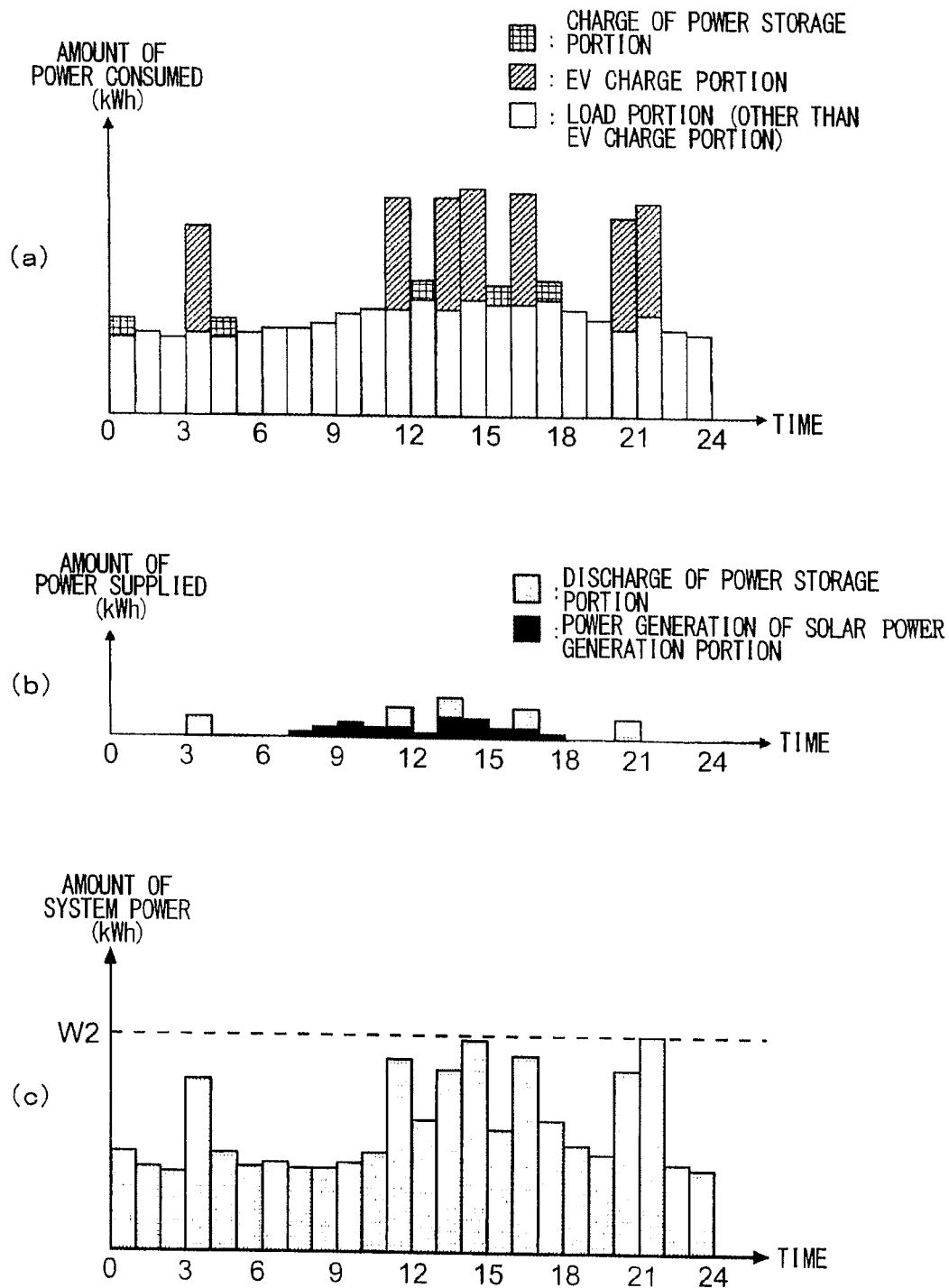

FIG.5
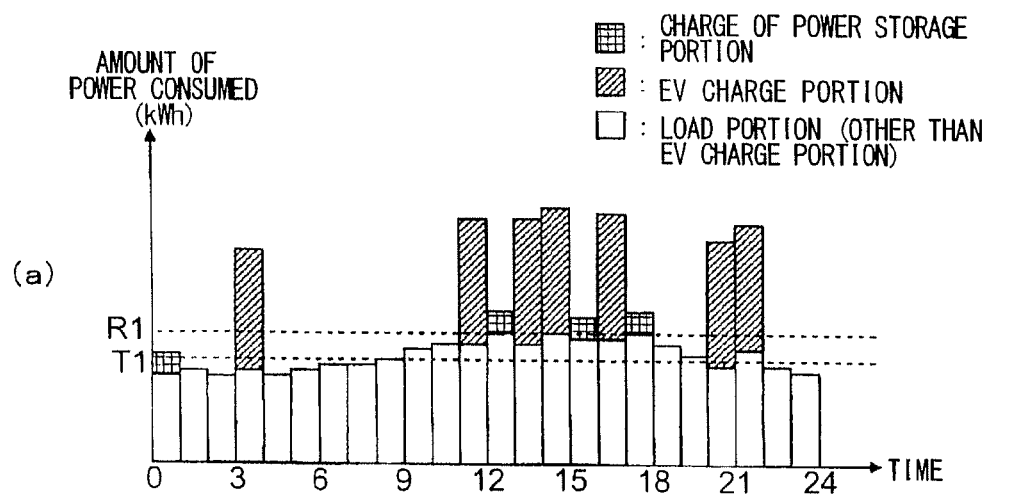
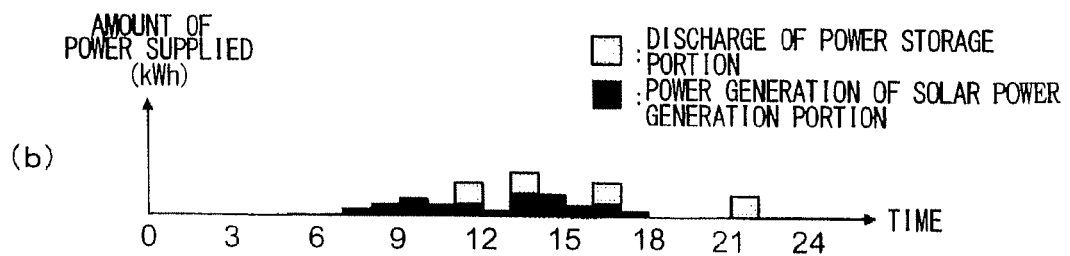
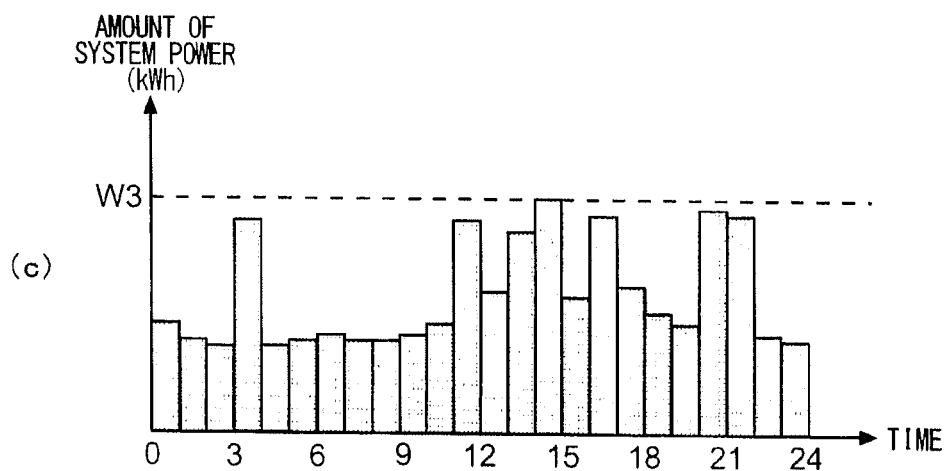

POWER SUPPLY SYSTEM WITH CONTROLLED POWER STORAGE

RELATED APPLICATIONS

This application is the U.S. National Phase under 35 U.S.C. §371 of International Application No. PCT/JP2011/056974, filed on Mar. 23, 2011, which in turn claims the benefit of Japanese Application No. 2010-067473, filed on Mar. 24, 2010, the disclosures of which Applications are incorporated by reference herein.

TECHNICAL FIELD

The present invention relates to a power supply system that supplies electric power.

BACKGROUND ART

In recent years, the capacity of storage batteries has been greatly increased, and the utilization of storage batteries, for example, for driving electric vehicles such as electric automobiles and electric motor bikes and for storing power consumed in homes, stores, buildings and the like has been examined; it is expected that storage batteries will be wildly used in the future.

Although storage batteries supply power by discharge, it is necessary to perform charge before discharge. Hence, when a storage battery often performs discharge to supply power, it is necessary to often charge the storage battery. For example, in patent document 1, a power supply system is proposed that includes a solar battery and a storage battery which is charged with power generated by the solar battery. In the power supply system described above, when the storage battery is fully charged, the charge is stopped, and the power that has been so far utilized for the charge and generated by the solar battery is instead utilized for cooling the storage battery. In this way, it is possible to decrease the temperature of the storage battery immediately after the full charge and to bring, in a short time, the storage battery into the state where it can be charged, without the waste of the power generated by the solar battery.

RELATED ART DOCUMENT

Patent Document

Patent document 1: JP-A-H5-284669

SUMMARY OF THE INVENTION

Problems to be Solved by the Invention

In the power supply system proposed in patent document 1, the storage battery can be rapidly brought into the state where it can be charged. However, since the power generated by the solar battery is low and unstable and the conditions (for example, in the daytime with a clear sky) in which power can be generated are limited, it is difficult to charge the storage battery rapidly and sufficiently only with such power. In other words, in the power supply system configured as described above, it is difficult to frequently charge the storage battery.

In contrast, by charging the storage battery not only with (or instead of) the power generated by the solar battery but also with, for example, stable power (hereinafter referred to as system power) supplied from an electric power company, it is possible to frequently charge the storage battery as described above.

However, when the storage battery is frequently charged with the system power, a timing when another device (load) consumes the system power and a timing when the storage battery is charged are overlapped, and thus the system power may be significantly consumed. Then, the power generated by the electric power company is temporarily increased (unstabilized); disadvantageously, for example, environmental burden is increased (for example, the amount of carbon dioxide discharged is increased) or the electric power charge is increased. In general, for example, in order for the electric power company to effectively generate power (to level out the power generated), as the maximum value of the amount of power purchased by a user per unit time (for example, 30 minutes) is higher, the electric power charge (especially, basic charge) is set higher. For example, the electric power charge includes the fixed basic charge and a usage-based charge.

Hence, the present invention has an object to provide a power supply system that can reduce the maximum value of the amount of power supplied to a load and a power storage portion per unit time and that can increase the amount of power stored in the power storage portion.

Means for Solving the Problem

To achieve the above object, according to the present invention, there is provided a power supply system that supplies power to loads, the power supply system including: a power storage portion that stores the supplied power and that supplies the power by discharge; and a charge-discharge control portion that controls charge of the power storage portion, in which, when a power or a current consumed by a specific one of the loads is equal to or less than a predetermined magnitude, the charge-discharge control portion performs control such that the power storage portion is charged.

In the power supply system configured as described above, the specific load is an EV charge portion that charges a battery included in an electric vehicle, the EV charge portion can perform: a first step in which a supplied current is made constant, and the battery is charged; and a second step in which, after the first step, the supplied current is made higher than in the first step and is made constant, and the battery is charged, and, when the EV charge portion performs the first step, in at least a part of a time period of the first step, the charge-discharge control portion performs control such that the power storage portion is charged.

In this configuration, in the time period of the first step in which the power consumed by the EV charge portion is relatively low, the power storage portion is charged. Thus, it is possible to reduce the increase in the maximum value of the amount of power supplied to the load and the power storage portion per unit time.

In the power supply system configured as described above, the specific load is the EV charge portion that charges the battery included in the electric vehicle, the EV charge portion can perform: the first step in which the supplied current is made constant, and the battery is charged; the second step in which, after the first step, the supplied current is made higher than in the first step and is made constant, and the battery is charged, and a third step in which, after the second step, a supplied voltage is made constant, and the battery is charged such that the supplied current is gradually decreased, and when the EV charge portion performs the third step, both in a time period of the third step and at least a part of a time period during which the current supplied to the battery is equal to or less than a predetermined magnitude, the charge-discharge control portion performs control such that the power storage portion is charged.

In this configuration, in the specific time period of the third step in which the power consumed by the EV charge portion 311 is relatively low, the power storage portion is charged. Thus, it is possible to reduce the increase in the maximum value of the amount of power supplied to the load and the power storage portion per unit time.

In the power supply system configured as described above, a load portion meter that measures the power or the current supplied from the power supply system to the load is further included, in which the charge-discharge control portion recognizes, based on a result of the measurement by the load portion meter, the power or a current consumed by the specific load.

In this configuration, the charge-discharge control portion can autonomously recognize whether or not the present time is in a time period during which the power storage portion can be charged. The load portion meter may measure a power or a current supplied to at least of the whole of the load, the specific load and the whole of the load other than the specific load.

In the power supply system configured as described above, the charge-discharge control portion may recognize, based on a signal output from the specific load and indicating the state of an operation, a power or a current consumed by the specific load.

In this configuration, the charge-discharge control portion can recognize whether or not the present time is in a time period during which the power storage portion can be charged.

In the power supply system configured as described above, a power supplied from an electric power company may be able to be supplied to the specific load and the power storage portion.

In this configuration, it is possible to reduce the increase in the maximum value of the amount of power system power supplied from the electric power company per unit time and to increase the amount of power stored in the power storage portion.

In the power supply system configured as described above, when the amount of power stored in the power storage portion is equal to or more than a predetermined magnitude, the charge-discharge control portion may perform control such that the power storage portion is not charged.

In this configuration, it is possible to reduce the unnecessary charge of the power storage portion. Hence, it is possible to reduce the increase in the maximum value of the amount of power supplied to the load and the power storage portion per unit time.

In the power supply system configured as described above, when a power or a current consumed by the specific load is more than a predetermined magnitude, the charge-discharge control portion may perform control such that the power storage portion is discharged.

In this configuration, it is possible to reduce the maximum value of the amount of power supplied to the load and the power storage portion per unit time.

Effects of the Invention

In the configuration of the present invention, it is possible to reduce the increase in the maximum value of the amount of power per unit time supplied to the load and the power storage portion and to increase the amount of power stored in the power storage portion. Moreover, in much more cases where the discharge of the power storage portion is necessary, the discharge of the power storage portion can be performed, and the amount of power supplied by the discharge of the power storage portion can be further increased. Hence, it is possible to more reduce the maximum value of the amount of power per unit time supplied to the load and the power storage portion.

The significance and effects of the present invention will be more obvious from the description of an embodiment indicated below. However, the embodiment below is simply one embodiment of the present invention; the present invention and the significance of the terms of constituent requirements are not limited to what is described in the embodiment below.

BRIEF DESCRIPTION OF DRAWINGS

[FIG. 2] A schematic diagram showing an example of a power storage portion installation space;

[FIG. 3] A graph showing an example of the amount of power consumed by a load portion;

[FIG. 4] A graph showing an example of basic control on the charge and discharge of the power storage portion when the amount of power consumed by the load portion is the amount of power shown in FIG. 3;

[FIG. 5] A graph showing an example of preferred control on the charge and discharge of the power storage portion when the amount of power consumed by the load portion is the amount of power shown in FIG. 3; and

DESCRIPTION OF EMBODIMENTS

A power supply system according to one embodiment of the present invention will be described below with reference to drawings.

<<Power Supply System>>

Figure 1:
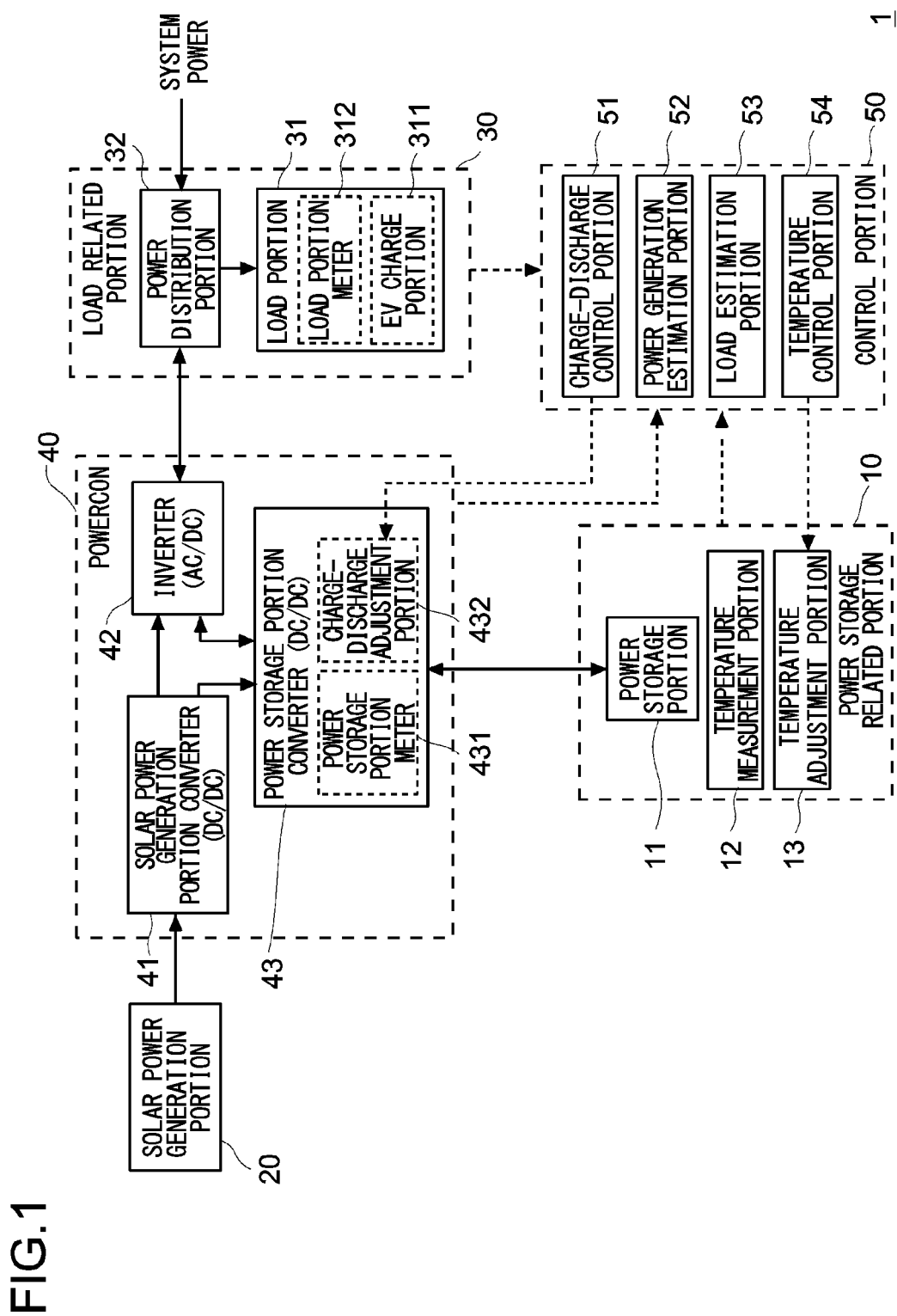
[FIG. 1] A block diagram showing an example of the configuration of a power supply system according to an embodiment of the present invention.

An example of the configuration of the power supply system according to the embodiment of the present invention will first be described with reference to the drawings. FIG. 1 is a block diagram showing the example of the configuration of the power supply system according to the embodiment of the present invention. Solid line arrows connecting individual blocks in the figure indicate the exchange of power; broken line arrows indicate the exchange of information.

The power supply system 1 shown in FIG. 1 includes: a power storage related portion 10 having a power storage portion 11 that stores supplied power and that supplies the power by discharge; a solar power generation portion 20 that generates power by solar power generation; a load related portion 30 having a load portion 31 that consumes power; a power conditioner (hereinafter referred to as a powercon) 40 that adjusts the exchange of the power; and a control portion 50 that controls the operations of the individual portions.

The power storage related portion 10 includes: the power storage portion 11; a temperature measurement portion 12 that measures the temperature of a space (hereinafter referred to as a power storage portion installation space) where the power storage portion 11 is installed; and a temperature adjustment portion 13 that adjusts the temperature of the power storage portion installation space.

The power storage portion 11 is formed with, for example, a high-capacity storage battery. The temperature measurement portion 12 is formed with, for example, a temperature sensor such as a thermistor or a thermocouple. The temperature adjustment portion 13 is formed with, for example, a device, such as an air cooling fan or an air conditioner (hereinafter referred to as an aircon), that can adjust temperature. Examples of the temperature adjustment portion 13 include not only a device, such as an air cooling fan or an aircon (cooling), that decreases temperature but also a device, such as an aircon (heating), a solar heat system or a discharge heat utilizing system, that increases temperature. The temperature adjustment portion 13 can be included in the load portion 31, which will be described later.

The power storage portion installation space will be described with reference to FIG. 2. FIG. 2 is a schematic view showing an example of the power storage portion installation space. FIG. 2(a) shows an example of a case where all or part of a space within a building S such as a shop is also used as a power storage portion installation space B1. FIG. 2(b) shows an example of a case where a power storage portion installation space B2 (that is, a special space for installing the power storage portion 11) separate from the other spaces within the building S is provided. In the example of FIG. 2(b), the power storage portion installation space B2 may be provided outside the building S.

The load related portion 30 includes the load portion 31 and a power distribution portion 32 that supplies the supplied power to the load portion 31 as necessary.

The load portion 31 is formed with various devices consuming power, and includes an EV charge portion 311 that charges a storage battery (battery) for driving an electric vehicle. In order to charge the battery of the electric vehicle, the EV charge portion 311 converts an alternating-current power supplied from the power distribution portion 32 into a direct-current power. Power (hereinafter referred to as system power) supplied from an electric power company and power supplied from the powercon 40 are supplied to the power distribution portion 32. The load portion 31 includes a load portion meter 312 that measures a power or a current (for example, a power or a current that is supplied to at least one of the whole of the load portion 31, the EV charge portion 311 and the whole of the load portion 31 other than the EV charge portion 311) supplied to the load portion 31.

The powercon 40 includes: a solar power generation portion converter 41 that converts an input direct-current power into a predetermined direct-current power and that outputs it; an inverter 42 that converts an input alternating-current power or direct-current power into a predetermined direct-current power or alternating-current power; and a power storage portion converter 43 that convers an input direct-current power into a predetermined direct-current power and that outputs it.

The solar power generation portion converter 41 converts a direct-current power generated by the solar power generation portion 20 into a direct-current power suitable for processing by the inverter 42 or the power storage portion converter 43 and outputs it. The inverter 42 converts the alternating-current system power input through the power distribution portion 32 into a direct-current power suitable for processing by the power storage portion converter 43 and outputs it. The inverter 42 converts a direct-current power output from the solar power generation portion converter 41 or a direct-current power output from the power storage portion converter 43 into an alternating-current power suitable for processing by the power distribution portion 32 or the load portion 31 and outputs it to the power distribution portion 32. The power storage portion converter 43 converts a direct-current power output from the solar power generation portion converter 41 or a direct-current power output from the inverter 42 into a direct-current power suitable for charging the power storage portion 11 and outputs it to the power storage portion 11. The power storage portion converter 43 converts a direct-current power supplied by the discharge of the power storage portion 11 into a direct-current power suitable for processing by the inverter 42 and outputs it.

The power storage portion converter 43 includes: a power storage portion meter 431 that measures at least one of a power or a current stored in the power storage portion 11 and a power or a current discharged by the power storage portion 11; and a charge-discharge adjustment portion 432 that charges and discharges the power storage portion 11.

The control portion 50 includes: a charge-discharge control portion 51 that controls the operation of the charge-discharge adjustment portion 432; a power generation estimation portion 52 that estimates the amount of power generated by the solar power generation portion 20; a load estimation portion 53 that estimates the amount of power consumed by the load portion 31; and a temperature control portion 54 that controls the operation of the temperature adjustment portion 13. Part or all of the control portion 50 may be installed within the powercon 40 or may be installed independently of the powercon 40.

The charge-discharge control portion 51 controls the charge-discharge adjustment portion 431 based on the amount of power estimated by the power generation estimation portion 52 and generated by the solar power generation portion 20 and the amount of power estimated by the load estimation portion 53 and consumed by the load portion 31. In this way, the charge and discharge of the power storage portion 11 are performed. An example of the control on the charge and discharge of the power storage portion 11 by the charge-discharge control portion 51 will be described later.

The power generation estimation portion 52 acquires, for example, from the solar power generation portion converter 41 of the powercon 40, information (for example, information indicating power being generated or a control signal controlling the operation of the solar power generation portion 20) on the power generation of the solar power generation portion 20, and thereby estimates the amount of power generated by the solar power generation portion 20. For example, a short-term estimation for a few minutes or a few hours is performed. The power generation estimation portion 52 may record the acquired information as necessary or may acquire information such as weather forecast from the outside. Furthermore, the recorded information and the information acquired from the outside are utilized, and thus, for example, a long-term estimation up to the next day or for a few days may be performed.

The load estimation portion 53 acquires, for example, from the load portion 31 of the load related portion 30, information (for example, information indicating a power or a current supplied to the load portion 31 or a control signal controlling the operation of the load portion 31) on the load portion 31, and thereby estimates the amount of power generated by the load portion 31. For example, a short-term estimation for a few minutes or a few hours is performed. The load estimation portion 53 may record the acquired information as necessary and utilize it for prediction to be performed later. Furthermore, the recorded information and the information acquired from the outside are utilized, and thus, for example, a long-term estimation up to the next day or for a few days may be performed.

The temperature control portion 54 acquires, for example, from the temperature measurement portion 12 of the power storage related portion 10, information indicating the temperature of the power storage portion installation space. The temperature control portion 54 also acquires, for example, from the power storage portion meter 431 of the powercon 40, information indicating a power or a current that is stored or discharged by the power storage portion 11. The temperature control portion 54 also acquires, for example, from the load portion meter 312 of the load related portion 30, information indicating a power or a current consumed by the load portion 31. The temperature control portion 54 also acquires, for example, from the load portion 31 (especially, the EV charge portion 311), a signal on the operation of the load portion 31 (especially, the EV charge portion 311). The temperature control portion 54 also acquires, for example, from the charge-discharge control portion 51 of the control portion 50, a control signal controlling the charge and discharge of the power storage portion 11.

Based on the acquired information and signals, the temperature control portion 54 controls the operation of the temperature adjustment portion 13. In particular, when the temperature control portion 54 recognizes conditions (for example, in which the temperature of the power storage portion installation space is high or in which the charge and discharge of the power storage portion 11 is performed) under which the temperature of the power storage portion 11 is likely to be increased, the temperature control portion 54 performs control such that the temperature of the power storage portion installation space is decreased. When the temperature control portion 54 recognizes conditions (for example, in which the temperature of the power storage portion installation space is low) under which the temperature of the power storage portion 11 is likely to be decreased, the temperature control portion 54 performs control such that the temperature of the power storage portion installation space is increased.

The temperature control portion 54 controls the temperature adjustment portion 13 as described above, and thus it is possible to reduce the increase in the temperature of the power storage portion 11, with the result that it is possible to rapidly charge and discharge the power storage portion 11 and extend the life of the power storage portion 11. Since it is possible to reduce the decrease in the temperature of the power storage portion 11, it is possible to reduce the decrease in the performance of the power storage portion 11 such as the discharge capacity.

The temperature measurement portion 12 may measure not only (or instead of) the temperature of the power storage portion installation space but also the temperature of the power storage portion 11. The temperature adjustment portion 13 may adjust not only (or instead of) the temperature of the power storage portion installation space but also the temperature of the power storage portion 11.

Although, in the configuration described above, a direct-current power supplied by the power storage portion 11 is converted by the inverter 42 into an alternating-current power, and then the alternating-current power is converted by the EV charge portion 311 into a direct-current power and is stored in the battery of the electric vehicle, the direct-current power supplied by the power storage portion 11 may be supplied directly to the battery of the electric vehicle. In this configuration, a simple interface may be provided between the power storage portion 11 and the battery of the electric vehicle.

The configuration of the power supply system 1 shown in FIG. 1 is simply an example; another configuration may be employed. For example, instead of the inverter 42, the power supply system 1 may include: a solar power generation portion inverter that converts a direct-current power output from the solar power generation portion converter 41 into an alternating-current power and that inputs it to the power distribution portion 32; and a power storage portion inverter that convers a direct-current power output from the power storage portion converter 43 into an alternating-current power to input it to the power distribution portion 32 and that converts an alternating-current power input through the power distribution portion 32 into a direct-current power to input it to the power storage portion converter 43. Furthermore, instead of this power storage portion inverter, the power supply system 1 may include: a supply inverter that converts a direct-current power output from the power storage portion converter 43 into an alternating-current power to input it to the power distribution portion 32; and a charge inverter that converts an alternating-current power input through the power distribution portion 32 into a direct-current power to input it to the power storage portion converter 43.

The relationship of inclusion in the individual blocks is developed only for ease of description; another relationship may be developed. For example, the power storage portion meter 431 and the charge-discharge adjustment portion 432 may be included in the power storage related portion 10 (or may not be included in the power storage portion converter 43). For example, the power storage portion converter 43 may be included in the power storage related portion 10 (or may not be included in the powercon 40).

<Charge-Discharge Control Portion>

[Basic Control Example]

A basic control example of the charge-discharge control portion 51 will now be described with reference to the drawings. FIG. 3 is a graph showing an example of the amount of power consumed by the load portion and shows the amount of power at each time period.

FIG. 3 separately shows the amount of power (in the figure, regions obliquely hatched) consumed by the EV charge portion 311 and the amount of power (in the figure, regions colored white) consumed by the load portion 31 other than the EV charge portion 311. The amount of power consumed by the load portion 31 other than the EV charge portion 311 refers to, for example, power consumed by various devices such as illumination units, an aircon and a refrigerator used in a shop (for example, a convenience store) incorporating the power supply system 1.

The amount of power consumed by the EV charge portion 311 is substantially equal to the amount of power consumed by the load portion 31 other than the EV charge portion 311 (for example, the orders of the amounts of power are substantially equal). In FIG. 3, the amount of power consumed by the load portion 31 other than the EV charge portion 311 varies but the power is consumed basically at all time periods (constantly); the power is consumed by the EV charge portion 311 when it is used by a user (temporarily).

Here, if the amount of power generated by the solar power generation portion 20 and the power supplied by the discharge of the power storage portion 11 are not utilized, the amount of power shown in FIG. 3 and consumed by the load portion 31 is all covered by the system power. Here, the maximum value W1 (14:00 to 15:00) of the amount of power consumed by the load portion 31 per unit time, as it is, is also covered by the system power. Then, as described previously, environmental burden or the electric power charge can be disadvantageously increased.

Hence, in the power supply system 1, the charge-discharge control portion 51 adaptively controls the charge and discharge of the power storage portion 11, or the power generated by the solar power generation portion 20 is consumed by the load portion 31, and thus the maximum value of the amount of system power per unit time is reduced. In particular, the discharge of the power storage portion 11 is performed when the EV charge portion 311 is operated, and thus the amount of system power necessary is reduced and the maximum value of the amount of system power per unit time is reduced.

A specific control example on the charge and discharge of the power storage portion 11 will be described with reference to the drawings. FIG. 4 is a graph showing a basic control example on the charge and discharge of the power storage portion when the amount of power consumed by the load portion is the amount of power shown in FIG. 3. FIG. 4(a) is a graph chronologically showing the amount of power consumed by the load portion 31; FIG. 4(b) is a graph chronologically showing the amount of power supplied other than the system power; FIG. 4(c) is a graph chronologically showing the amount of system power necessary.

As shown in FIGS. 4(a) and 4(b), in the present control example, when the operation of the EV charge portion 311 is recognized by the charge-discharge control portion 51, the charge-discharge adjustment portion 432 is controlled to discharge the power storage portion 11 (for example, 11:00 to 12:00). When the charge-discharge control portion 51 discharges the power storage portion 11, and then recognizes that the EV charge portion 311 is not operated, the charge-discharge adjustment portion 432 is controlled to charge the power storage portion 11 (for example, 12:00 to 13:00).

The charge-discharge control portion 51 references, for example, the control signal of the load portion 31 (especially, the EV charge portion 311), the result of the measurement by the load portion meter 312, the result of the estimation by the load estimation portion 53 and the like, and thereby can recognize whether or not the EV charge portion 311 is operated and the amount of power consumed by the load portion 31.

As shown in FIG. 4(b), in the daytime (7:00 to 18:00), the amount of power generated by the solar power generation portion 20 is also supplied. The amount of power obtained by subtracting the amount of supplied power shown in FIG. 4(b) from the amount of power shown in FIG. 4(a) and consumed by the load portion 31 is the amount of necessary system power shown in FIG. 4(c).

In this control, part of the amount of power consumed by the load portion 31 can be covered by the amount of power supplied by the discharge of the power storage portion 11 and the amount of power generated by the solar power generation portion 20. Hence, as shown in FIG. 4(c), it is possible to reduce the maximum value of the amount of system power per unit time. Specifically, it is possible to reduce the maximum value W2 (21:00 to 22:00) of the amount of system power per unit time to less than the maximum value W1 of the amount of power per unit time shown in FIG. 3. The power storage portion 11 is not charged while the EV charge portion 311 is being operated, and thus it is possible to reduce the increase in the maximum value of the amount of system power per unit time.

Incidentally, when, as shown in FIG. 4, control is conducted to alternately perform the charge and discharge every predetermined time period, if the EV charge portion 311 is operated in a continuous time period of, for example, 13:00 to 15:00 or 20:00 to 22:00 shown in FIG. 4(a), the power storage portion 11 is not charged in the latter half of the time period (14:00 to 15:00 or 21:00 to 22:00), with the result that it is impossible to perform the discharge. Then, it may be impossible to sufficiently reduce the maximum value of the amount of system power per unit time.

Hence, a preferred example of more adaptively controlling the charge and discharge of the power storage portion 11 by the charge-discharge control portion 51 will be described with reference to the drawings. FIG. 5 is a graph showing the preferred example of controlling the charge and discharge of the power storage portion when the amount of power consumed by the load portion is the amount of power shown in FIG. 3. FIGS. 5(a) to 5(c) can correspond to and be compared with FIGS. 4(a) to 4(b), respectively. In the following description, differences between FIGS. 5(a) to 5(c) and FIGS. 4(a) to 4(b) will be mainly discussed, and the description of the same portions will not be repeated.

As shown in FIGS. 5(a) to 5(c), the present control example is obtained by adding, to the control example of FIG. 4, the following control: "when the amount of power consumed by the load portion 31 other than the EV charge portion 311 per unit time is less than a threshold value T1 based on the maximum value R1, even if the EV charge portion 311 is operated, the discharge of the power storage portion 11 is not performed." The maximum value R1 may be set by a long-term estimation by the load estimation portion 53 or may be updated as necessary. The threshold value T1 may be set lower than the maximum value R1 by a predetermined magnitude or may be set equal to a value obtained from a predetermined proportion (which is less than 1) of the maximum value R1.

In this control, the discharge of the power storage portion 11 is not performed, for example, in the first half of the time period (20:00 to 21:00) during which the amount of power consumed by the load portion 31 other than the EV charge portion 311 is not relatively high, in the time period of 20:00 to 22:00. Furthermore, the discharge of the power storage portion 11 is performed and power is supplied, in the latter half of the time period (21:00 to 22:00) during which the amount of power consumed by the load portion 31 other than the EV charge portion 311 is relatively high.

Thus, it is possible to more adaptively control the discharge of the power storage portion 11 (to prevent the discharge of the power storage portion 11 in a time period during which the amount of power consumed by the load portion 31 cannot be high). Hence, as shown in FIG. 5(c), it is possible to more reduce the amount of system power. Specifically, it is possible to reduce the maximum value W3 (14:00 to 15:00) of the amount of system power per unit time to less than the maximum value W2 of the amount of system power per unit time shown in FIG. 4(c).

Although the example where the charge-discharge control portion 51 controls the charge and discharge of the power storage portion 11 based on whether or not the EV charge portion 311 is operated has been described, the charge-discharge control portion 51 may control it based on whether or not a load other than the EV charge portion 311 is operated. However, the charge-discharge control portion 51 preferably controls it based on whether or not a portion that can temporarily and rapidly increase the amount of power consumed by the load portion 31 as with the EV charge portion 311 is operated.

When a plurality of EV charge portions 311 are provided in a shop or the like, the charge-discharge control portion 51 may control the charge and discharge of the power storage portion 11 based on whether or not a predetermined number or more of EV charge portions 311 are operated.

[Extension of a Chargeable Time Period]

In the basic control example described above, the control is performed such that the charge of the power storage portion 11 is not performed while the EV charge portion 311 is being operated, and thus the increase in the maximum value of the amount of system power per unit time is reduced. However, in this control, for example, when the EV charge portion 311 is operated in the continuous time period as described above, the time period during which the power storage portion 11 can be changed is limited. Then, since the number of times the power storage portion 11 is discharged is reduced or the amount of power discharged is reduced, there is a possibility that the maximum value of the amount of system power per unit time is not effectively reduced.

Figure 6:
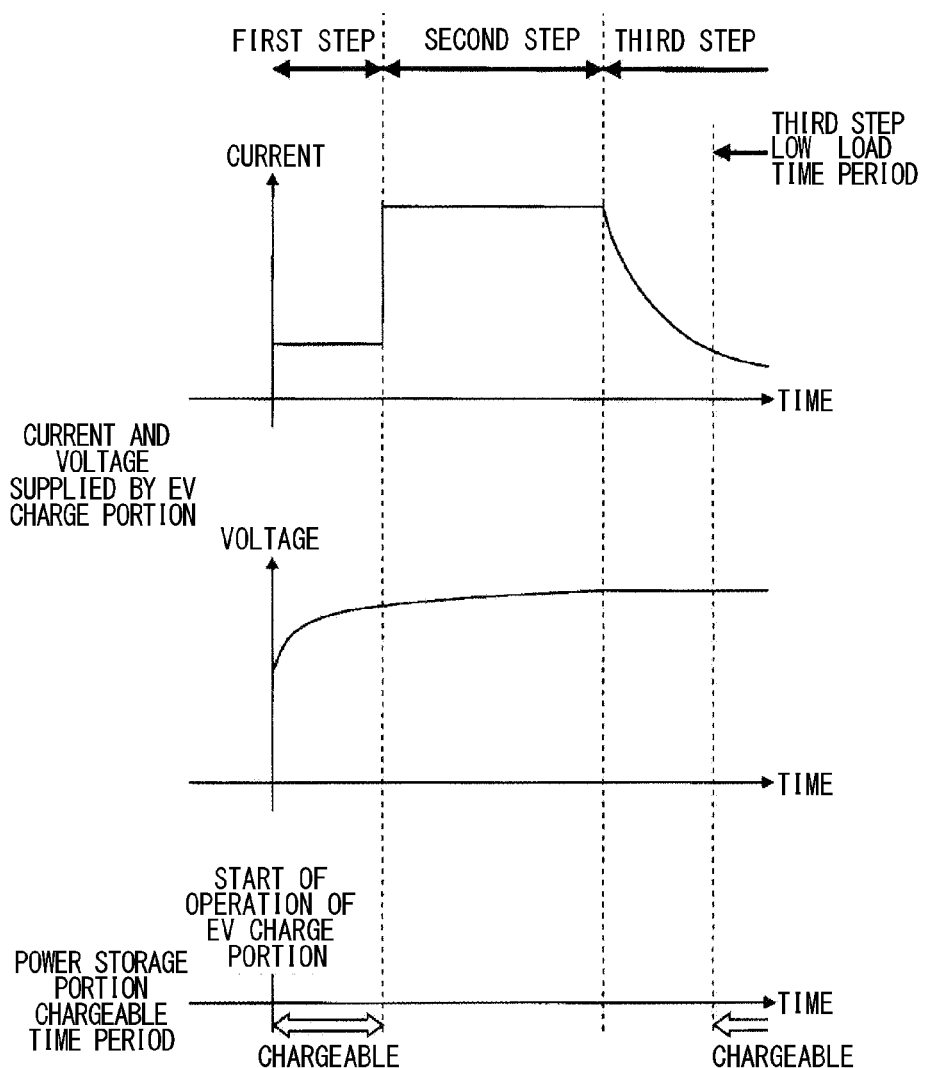
[FIG. 6] A graph showing an example of the operation of an EV charge portion and the chargeable time period of the power storage portion.

Hence, a control example of extending the chargeable time period of the power storage portion 11 will be described below with reference to the drawings. FIG. 6 is a graph showing an example of the operation of the EV charge portion and the chargeable time period of the power storage portion.

As shown in FIG. 6, in the present example, the EV charge portion 311 stepwise charges the battery of an electric vehicle using a plurality of methods. For example, the charge is performed in a first step where the charge is performed with a relatively low constant current until a predetermined voltage is reached, in a second step where the charge is performed with a constant current higher than in the first step until a predetermined voltage is reached and in a third step where the charge is performed with a constant voltage value. In the first and second steps, as the charge proceeds, the voltage supplied by the EV charge portion 311 to the battery of the electric vehicle is increased (the power consumed by the EV charge portion 311 is increased) whereas, in the third step, as the charge proceeds, the current supplied by the EV charge portion 311 to the battery of the electric vehicle is decreased (the power consumed by the EV charge portion 311 is decreased).

The charge is performed in the following order: the start of the operation of the EV charge portion 311, the first step, the second step and the third step. For example, when, in the third step, the current supplied by the EV charge portion 311 to the battery of the electric vehicle becomes equal to or less than a predetermined current, it is determined that the battery of the electric vehicle is fully charged, and thus the charge is completed.

As shown in FIG. 6, in the first step, the power consumed by the EV charge portion 311 is relatively low. Hence, even when the power storage portion 11 is charged during the first step, it is possible to reduce the increase in the maximum value of the amount of system power per unit time.

Even in the third step, the power consumed by the EV charge portion 311 is relative low only in a time period (hereinafter referred to as a third step low load time period) from when the current supplied (charged) by the EV charge portion 311 to the battery of the electric vehicle becomes equal to or less than a predetermined magnitude to the end of the third step. Hence, even when the power storage portion 11 is charged during the third step low load time period, it is possible to reduce the increase in the maximum value of the amount of system power per unit time.

The time period of the first step and the third step low load time period are a time period during which the power storage portion 11 can be charged. Hence, in all these time periods, the power storage portion 11 can be charged or in part of these time periods, the power storage portion 11 can be charged.

The charge-discharge control portion 51 acquires, from the EV charge portion 311, a signal (for example, a signal indicating the start of the operation or a signal indicating any of the first to third steps and the third step low load time period) on the operation, and thereby can recognize whether or not the present time is within the chargeable time period. The result of the measurement by the load portion meter 312 or an EV charge portion meter is acquired, and thus it is possible to increase the power or the amount of power consumed by the load portion 31 or the EV charge portion 311. Moreover, in much more cases where the discharge of the power storage portion 11 is necessary, the discharge of the power storage portion 11 can be performed, and the amount of power supplied by the power storage portion 11 can be further increased. Hence, it is possible to more reduce the maximum value of the amount of power of system power per unit time.

When the amount of power stored in the power storage portion 11 is equal to or more than a predetermined magnitude (for example, in the case of the full charge), the charge-discharge control portion 51 may not charge the power storage portion 11.

In this configuration, it is possible to reduce the unnecessary charge of the power storage portion 11. Hence, it is possible to reduce the increase in the maximum value of the amount of system power per unit time.

Normal charge in which the amount of power per unit time supplied by the EV charge portion 311 to the battery of the electric vehicle is relatively lowered and rapid charge in which it is relatively increased may be able to be performed. In this case, only when the EV charge portion 311 performs the rapid charge, the charge-discharge control portion 51 may control the charge and discharge of the power storage portion 11 as described above. For example, the charge-discharge control portion 51 may perform control to charge the power storage portion 11 during the normal charge of the EV charge portion 311.

In this configuration, only when the maximum value of the amount of system power per unit time can be increased, the charge of the power storage portion 11 is limited. Hence, it is possible to reduce the increase in the maximum value of the amount of system power per unit time and to more increase the amount of power stored in the power storage portion 11.

Normal charge in which the amount of power per unit time supplied by the charge-discharge control portion 51 to the power storage portion 11 is relatively lowered and rapid charge in which it is relatively increased may be able to be performed. In this case, only when the charge-discharge control portion 51 performs the rapid charge of the power storage portion 11, the charge and discharge of the power storage portion 11 may be controlled as described above. For example, the charge-discharge control portion 51 may perform control to normally charge the power storage portion 11 during the operation of the EV charge portion 311.

In this configuration, only when the maximum value of the amount of system power per unit time can be increased, the charge of the power storage portion 11 is limited. Hence, it is possible to reduce the increase in the maximum value of the amount of system power per unit time and to more increase the amount of power stored in the power storage portion 11.

During the operation of the EV charge portion 311, the power storage portion 11 may be charged with the power generated by the solar power generation portion 20.

The example of the operation of the EV charge portion 311 shown in FIG. 6 is simply an example; the EV charge portion 311 may perform an operation different from that of FIG. 6. For example, when a sufficiently large amount of power is stored in the battery of the electric vehicle at the start of the operation of the EV charge portion 311, the first step may not be performed. For example, when the EV charge portion 311 performs the rapid charge, the third step may not be performed.

Although the configuration where the system power supplied from the electric power company and the power generated by the solar power generation portion 20 are stored in the power storage portion 11 has been described, power obtained from a power source other than those sources may be stored in the power storage portion 11.

<<Variations>>

In the power supply system 1 according to the embodiment of the present invention, part or all of the operation of the control portion 50 and the like may be performed by a control device such as a micon. Furthermore, all or part of the function realized by such a control device is described as a program, and the program is executed on a program execution device (for example, a computer), with the result that all or part of the function may be executed.

In addition to the cases described above, the power supply system 1 shown in FIG. 1 can be realized by hardware or a combination of hardware and software. When part of the charging system is configured with software, the block of a portion realized by software represents the functional block of the portion.

Although the embodiment of the present invention has been described above, the scope of the present invention is not limited to the embodiment; many modifications are possible without departing from the spirit of the present invention.

INDUSTRIAL APPLICABILITY

The present invention can be utilized for a power supply system that supplies power.

LIST OF REFERENCE SYMBOLS 1 power supply system
10 power storage related portion
11 power storage portion
12 temperature measurement portion
13 temperature adjustment portion
20 solar power generation portion
30 load related portion
31 load portion
311 EV charge portion
32 power distribution portion
312 load portion meter
40 powercon (power conditioner)
41 solar power generation portion converter
42 inverter
43 power storage portion converter
431 power storage portion meter
432 charge-discharge adjustment portion
50 control portion
51 charge-discharge control portion
52 power generation estimation portion
53 load estimation portion
54 temperature control portion

The invention claimed is:

1. A power supply system that supplies power to a load including a specific load, which consumes power temporarily when used by a user, and a load portion, which is other than the specific load and which consumes power constantly at all time periods, the power supply system comprising:
a power storage portion; and
a charge-discharge control portion that controls charge and discharge of the power storage portion,
wherein, when power is supplied to the specific load,
in a time period during which a current flowing through the specific load, which is part of the load, is equal to or less than a predetermined magnitude, the charge-discharge control portion performs control such that the power storage portion is charged, and
in a time period during which the current flowing through the specific load, which is part of the load, is more than the predetermined magnitude, the charge-discharge control portion performs control such that the power storage portion is discharged,
the power is supplied to the specific load and to the power storage portion by a power source other than the power storage portion,
the specific load is an EV charge portion that charges a battery included in an electric vehicle,
the EV charge portion can perform:
a first step in which a current supplied to the battery is made constant, and the battery is charged; and
a second step in which, after the first step, the current supplied to the battery is made higher than in the first step and is made constant, and the battery is charged, and
when the EV charge portion performs the first step, in at least a part of a time period of the first step, the charge-discharge control portion performs control such that the power storage portion is charged.

2. The power supply system of claim 1, further comprising:
a load portion meter that measures power or a current supplied from the power supply system to the load,
wherein the charge-discharge control portion recognizes, based on a result of the measurement by the load portion meter, the power or the current consumed by the specific load.

3. The power supply system of claim 1, wherein the charge-discharge control portion recognizes, based on a signal output from the specific load and indicating a state of an operation, power or a current consumed by the specific load.

4. The power supply system of claim 1, wherein power supplied from an electric power company can be supplied to the specific load and the power storage portion.

5. A power supply system that supplies power to a load including a specific load, which consumes power temporarily when used by a user, and a load portion, which is other than the specific load and which consumes power constantly at all time periods, the power supply system comprising:
a power storage portion; and
a charge-discharge control portion that controls charge and discharge of the power storage portion,
wherein, when power is supplied to the specific load,
in a time period during which power consumed by the specific load, which is part of the load is equal to or less than a predetermined magnitude, the charge-discharge control portion performs control such that the power storage portion is charged, and
in a time period during which the power consumed by the specific load, which is part of the load, is more than the predetermined magnitude, the charge-discharge control portion performs control such that the power storage portion is discharged,
the power is supplied to the specific load and to the power storage portion by a power source other than the power storage portion,
the specific load is an EV charge portion that charges a battery included in an electric vehicle,
the EV charge portion can perform:
a first step in which a current supplied to the battery is made constant, and the battery is charged; and
a second step in which, after the first step, the current supplied to the battery is made higher than in the first step and is made constant, and the battery is charged, and
when the EV charge portion performs the first step, in at least a part of a time period of the first step, the charge-discharge control portion performs control such that the power storage portion is charged.

6. The power supply system of claim 5, further comprising:
a load portion meter that measures power or a current supplied from the power supply system to the load,
wherein the charge-discharge control portion recognizes, based on a result of the measurement by the load portion meter, the power or the current consumed by the specific load.

7. The power supply system of claim 5, wherein the charge-discharge control portion recognizes, based on a signal output from the specific load and indicating a state of an operation, power or a current consumed by the specific load.

8. The power supply system of claim 5, wherein power supplied from an electric power company can be supplied to the specific load and the power storage portion.

9. A power supply system that supplies power to a load including a specific load, which consumes power temporarily when used by a user, and a load portion, which is other than the specific load and which consumes power constantly at all time periods, the power supply system comprising:
a power storage portion; and
a charge-discharge control portion that controls charge and discharge of the power storage portion,
wherein, when power is supplied to the specific load,
in a time period during which a current flowing through the specific load, which is part of the load, is equal to or less than a predetermined magnitude, the charge-discharge control portion performs control such that the power storage portion is charged, and
in a time period during which the current flowing through the specific load, which is part of the load, is more than the predetermined magnitude, the charge-discharge control portion performs control such that the power storage portion is discharged,
the power is supplied to the specific load and to the power storage portion by a power source other than the power storage portion,
the specific load is an EV charge portion that charges a battery included in an electric vehicle,
the EV charge portion can perform:
a first step in which a current supplied to the battery is made constant, and the battery is charged;
a second step in which, after the first step, the current supplied to the battery is made higher than in the first step and is made constant, and the battery is charged, and
a third step in which, after the second step, a supplied voltage is made constant, and the battery is charged such that the current supplied to the battery is gradually decreased, and
when the EV charge portion performs the third step, in a time period that is both during the third step and also when the current supplied to the battery is equal to or less than a predetermined magnitude, the charge-discharge control portion performs control such that the power storage portion is charged.

10. The power supply system of claim 9, further comprising:
a load portion meter that measures power or a current supplied from the power supply system to the load,
wherein the charge-discharge control portion recognizes, based on a result of the measurement by the load portion meter, the power or the current consumed by the specific load.

11. The power supply system of claim 9, wherein the charge-discharge control portion recognizes, based on a signal output from the specific load and indicating a state of an operation, power or a current consumed by the specific load.

12. The power supply system of claim 9, wherein power supplied from an electric power company can be supplied to the specific load and the power storage portion.

13. A power supply system that supplies power to a load including a specific load, which consumes power temporarily when used by a user, and a load portion, which is other than the specific load and which consumes power constantly at all time periods, the power supply system comprising:
a power storage portion; and
a charge-discharge control portion that controls charge and discharge of the power storage portion,
wherein, when power is supplied to the specific load,
in a time period during which power consumed by the specific load, which is part of the load is equal to or less than a predetermined magnitude, the charge-discharge control portion performs control such that the power storage portion is charged, and
in a time period during which the power consumed by the specific load, which is part of the load, is more than the predetermined magnitude, the charge-discharge control portion performs control such that the power storage portion is discharged,
the power is supplied to the specific load and to the power storage portion by a power source other than the power storage portion,
the specific load is an EV charge portion that charges a battery included in an electric vehicle,
the EV charge portion can perform:
a first step in which a current supplied to the battery is made constant, and the battery is charged;
a second step in which, after the first step, the current supplied to the battery is made higher than in the first step and is made constant, and the battery is charged, and
a third step in which, after the second step, a supplied voltage is made constant, and the battery is charged such that the current supplied to the battery is gradually decreased, and
when the EV charge portion performs the third step, in a time period that is both during the third step and also when the current supplied to the battery is equal to or less than a predetermined magnitude, the charge-discharge control portion performs control such that the power storage portion is charged.

14. The power supply system of claim 13, further comprising:
a load portion meter that measures power or a current supplied from the power supply system to the load,
wherein the charge-discharge control portion recognizes, based on a result of the measurement by the load portion meter, the power or the current consumed by the specific load.

15. The power supply system of claim 13, wherein the charge-discharge control portion recognizes, based on a signal output from the specific load and indicating a state of an operation, power or a current consumed by the specific load.

16. The power supply system of claim 13, wherein power supplied from an electric power company can be supplied to the specific load and the power storage portion.

* * * * *